(12) United States Patent
Baughman et al.

(10) Patent No.: US 9,819,116 B1
(45) Date of Patent: Nov. 14, 2017

(54) ELECTRICAL OUTLET ASSEMBLY FOR A VEHICLE AND METHODS OF ASSEMBLING SAME

(71) Applicant: Honda Motor Co., Ltd., Tokyo (JP)

(72) Inventors: Daniel M. Baughman, West Liberty, OH (US); Alex W. Baker, Ostrander, OH (US)

(73) Assignee: Honda Motor Co., Ltd., Tokyo (JP)

( * ) Notice: Subject to any disclaimer, the term of this patent is extended or adjusted under 35 U.S.C. 154(b) by 13 days.

(21) Appl. No.: 15/148,768

(22) Filed: May 6, 2016

(51) Int. Cl.
*H01R 13/52* (2006.01)
*B60R 13/07* (2006.01)
*B62D 25/24* (2006.01)
*B60R 16/03* (2006.01)

(52) U.S. Cl.
CPC ......... *H01R 13/5227* (2013.01); *B60R 13/07* (2013.01); *B60R 16/03* (2013.01); *B62D 25/24* (2013.01); *H01R 13/5202* (2013.01); *H01R 13/5213* (2013.01); *H01R 2201/26* (2013.01)

(58) Field of Classification Search
CPC ..... B60L 11/1818; B60R 13/07; B60R 16/03; B62D 25/24; H01R 13/5202; H01R 13/5213; H01R 13/5227
USPC .................................. 296/24.45, 37.6, 182.1
See application file for complete search history.

(56) References Cited

U.S. PATENT DOCUMENTS

| | | | |
|---|---|---|---|
| 3,288,910 A | 11/1966 | Zerwes | |
| 4,793,819 A | 12/1988 | Berg | |
| 5,816,643 A | 10/1998 | Itou et al. | |
| 6,598,914 B1 | 7/2003 | Dixon | |
| 6,840,785 B2 | 1/2005 | Drane | |
| 7,554,034 B2 | 6/2009 | Smith | |
| 7,988,453 B2* | 8/2011 | Loo | B60L 11/1818 439/142 |
| 8,288,651 B2 | 10/2012 | Smith et al. | |
| 8,323,047 B2 | 12/2012 | Reusche et al. | |

(Continued)

FOREIGN PATENT DOCUMENTS

| | | |
|---|---|---|
| CN | 202216845 U | 5/2012 |
| WO | 9007212 A1 | 6/1990 |
| WO | 2007020367 A1 | 2/2007 |

OTHER PUBLICATIONS

"2015 Toyota Tacoma tackles the Laurentians!" http://blogs.canoe.com/outdoorsguy/tag/kenauk/ (Accessed Jan. 12, 2016).

(Continued)

*Primary Examiner* — Jason S Daniels
(74) *Attorney, Agent, or Firm* — Armstrong Teasdale LLP (57) ABSTRACT

An electrical outlet assembly for a vehicle is provided. The electrical outlet assembly includes a panel and an electrical receptacle. The panel includes a sidewall and a bottom wall that extends from the sidewall, and is coupleable to a vehicle panel of the vehicle to define an interior cavity therewith. The electrical receptacle is coupled within a receptacle opening defined in the sidewall. The sidewall defines a first drain opening beneath the electrical receptacle, and the bottom wall at least partially defines a second drain opening, each of the first and second drain openings providing fluid communication with the interior cavity. The panel is configured to direct fluid that enters the interior cavity through the first drain opening out of the second drain opening and away from the electrical receptacle.

20 Claims, 7 Drawing Sheets

(56) References Cited

U.S. PATENT DOCUMENTS

| | | |
|---|---|---|
| 8,597,039 B2 | 12/2013 | Osawa |
| 8,827,731 B2 | 9/2014 | Sasaki et al. |
| 2005/0016713 A1 | 1/2005 | Houck |
| 2014/0084680 A1* | 3/2014 | Tseng ..................... B60R 16/03 |
| | | 307/10.1 |

OTHER PUBLICATIONS

"Toyota Tacoma Owners Manual: Power Outlet" http://www.ttguide.net/power_outlet_120_vac_8727_-114.html (Accessed Jan. 12, 2016).

* cited by examiner

ELECTRICAL OUTLET ASSEMBLY FOR A VEHICLE AND METHODS OF ASSEMBLING SAME

BACKGROUND

The present disclosure relates generally to electrical outlet assemblies for vehicles and, more specifically, to electrical outlet assemblies for use on an exterior of a vehicle.

Electrical outlets located on the exterior of a vehicle may be susceptible to ingress of moisture and liquids. At least some known electrical outlet assemblies provide less than satisfactory means for draining moisture and other liquids that may have permeated weatherproofing seals used with such outlet assemblies, which may result in improper functioning of the electrical outlet assembly. Moreover, at least some known electrical outlet assemblies use waterproofed or weatherproofed electrical receptacles and/or harness connectors. However, use of waterproofed or weatherproofed electrical receptacles and harness connectors generally increases the cost and complexity of producing vehicles with exterior electrical outlet assemblies.

BRIEF SUMMARY

In one aspect, an electrical outlet assembly for a vehicle is provided. The electrical outlet assembly includes a panel and an electrical receptacle. The panel includes a sidewall and a bottom wall that extends from the sidewall, and is coupleable to a vehicle panel of the vehicle to define an interior cavity therewith. The electrical receptacle is coupled within a receptacle opening defined in the sidewall. The sidewall defines a first drain opening beneath the electrical receptacle, and the bottom wall at least partially defines a second drain opening, each of the first and second drain openings providing fluid communication with the interior cavity. The panel is configured to direct fluid that enters the interior cavity through the first drain opening out of the second drain opening and away from the electrical receptacle.

In another aspect, a truck is provided. The truck includes a truck bed defined by a plurality of bed panels, and an electrical outlet assembly positioned within the truck bed. The electrical outlet assembly includes a panel and an electrical receptacle. The panel includes a sidewall and a bottom wall that extends from the sidewall, and is coupled to one of the plurality of bed panels to define an interior cavity therewith. The electrical receptacle is coupled within a receptacle opening defined in the sidewall. The sidewall defines a first drain opening beneath the electrical receptacle, and the bottom wall at least partially defines a second drain opening, each of the first and second drain openings providing fluid communication with the interior cavity. The panel is configured to direct fluid that enters the interior cavity through the first drain opening out of the second drain opening and into the truck bed.

In yet another aspect, a method of assembling an electrical outlet assembly on a vehicle is provided. The method includes providing a panel including a sidewall and a bottom wall extending from the sidewall, where the sidewall defines a first drain opening and the bottom wall at least partially defines a second drain opening, coupling an electrical receptacle within a receptacle opening defined in the sidewall such that the first drain opening is positioned beneath the electrical receptacle, and coupling the panel to a vehicle panel of the vehicle to define an interior cavity therewith. Coupling the panel includes coupling the panel to the vehicle panel such that each of the first and second drain openings provides fluid communication with the interior cavity and such that the panel is configured to direct fluid that enters the interior cavity through the first drain opening out of the second drain opening and away from the electrical receptacle.

DETAILED DESCRIPTION

The embodiments described herein relate generally to electrical outlet assemblies for vehicles and, more specifically, to electrical outlet assemblies for use on an exterior of a vehicle. As described further herein, embodiments of electrical outlet assemblies described herein facilitate preventing or inhibiting the ingress of water and/or other liquids to electrical receptacles located on an exterior of a vehicle (i.e., outside the interior compartment). Moreover, electrical outlet assemblies of the present disclosure facilitate reducing the costs and time associated with producing vehicles that include exterior electrical outlet assemblies, as compared to at least some known vehicles, by enabling use of non-waterproofed or weatherproofed electrical receptacles on the exterior of a vehicle.

Figure 1:
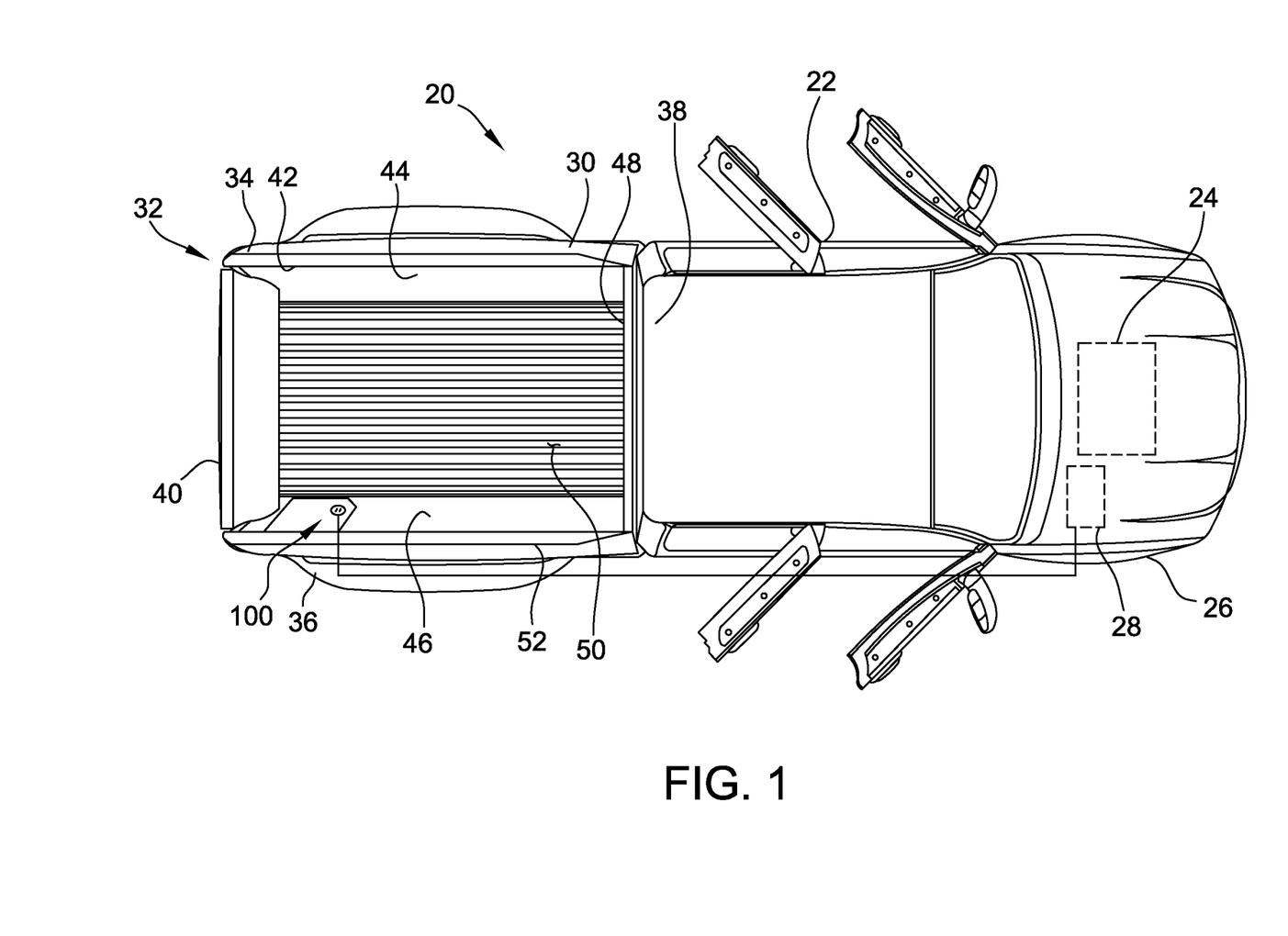
FIG. 1 is a schematic view of an exemplary vehicle including an exemplary electrical outlet assembly.

FIG. 1 is a schematic view of an exemplary vehicle 20 including an exemplary exterior electrical outlet assembly 100. In the exemplary embodiment, vehicle 20 is an automobile, and generally includes a frame 22, a propulsion system 24, a plurality of wheels 26 rotatably coupled to the vehicle frame 22, and a transmission (not shown) connecting propulsion system 24 to one or more of wheels 26. Propulsion system 24 may include any suitable engine or motor that provides power for propelling vehicle 20. Propulsion system 24 may include, for example and without limitation, a gasoline powered engine, an electric motor, and combinations thereof. The transmission is coupled to propulsion system 24 such that power from propulsion system 24 is transmitted through the transmission, to a drivetrain (not shown), and to wheels 26 to propel vehicle 20. In other embodiments, vehicle 20 may be any other vehicle other than an automotive vehicle including, for example and without limitation, a recreational vehicle, a watercraft vehicle, or an aircraft vehicle.

Vehicle 20 also includes an energy storage device 28 configured to store electric energy and to supply electrical power to one or more components of vehicle 20. In some embodiments, energy storage device 28 supplies electrical power in the form of alternating current (AC), and functions as an AC power supply. In some embodiments, for example, vehicle 20 may include a power inverter that is electrically coupled between energy storage device 28 and at least one component of vehicle 20 such that energy storage device 28 supplies AC current to that vehicle component. Additionally or alternatively, energy storage device 28 may be configured to supply electrical power in the form of direct current (DC), and functions as a DC power supply. In other embodiments, energy storage device 28 may supply power to components of vehicle 20 in any suitable manner that enables vehicle 20 and electrical outlet assembly 100 to function as described herein. Energy storage device 28 may include, for example and without limitation, a rechargeable battery, such as a lead-acid battery and/or a lithium ion battery. Energy storage device 28 may be operatively coupled to one or more components of vehicle 20, such as an alternator that generates electrical energy during operation of vehicle 20. In the exemplary embodiment, electrical outlet assembly 100 is electrically coupled to energy storage device 28 via a suitable electrical conduit (e.g., conductive wiring or cable) to receive electrical power therefrom. In other embodiments, electrical outlet assembly 100 may be coupled to a power supply other than energy storage device 28.

In the exemplary embodiment, vehicle 20 also includes a plurality of body panels 30 that define various portions of vehicle 20. For example, body panels 30 may form the front end, the hood, the bumpers, the doors, the roof, the back end, and/or the side panels of vehicle 20. In the exemplary embodiment, vehicle 20 is a truck that includes a cargo compartment in the form of a truck bed 32. In other embodiments, vehicle 20 may be an automobile other than a truck, such as, a sport utility vehicle, a van, a minivan, a cargo van, and a passenger car. In yet other embodiments, vehicle 20 may include a cargo compartment other than a truck bed, such as a trunk or a storage hatch.

Truck bed 32 is defined by a plurality of exterior bed panels including a driver side body panel 34, a passenger side body panel 36, and a head board body panel 38. A tailgate 40 is opposite head board body panel 38 to provide selective access to truck bed 32. Driver and passenger side body panels 34 and 36 include wheel wells formed around rear wheels of vehicle 20. In an exemplary embodiment, body panels 30 may be manufactured from composite materials and/or any other materials suitable for vehicle construction, such as metal. Body panels 30 may define exterior portions of vehicle 20.

In the exemplary embodiment, truck bed 32 includes a plurality of vehicle panels 42 that define the interior of the truck bed 32. In the exemplary embodiment, vehicle panels 42 include a driver side bed panel 44, a passenger side bed panel 46, and a head board bed panel 48. Vehicle panels 42 that define the interior of truck bed (e.g., driver side bed panel 44, passenger side bed panel 46, and head board bed panel 48) are interchangeably referred to herein as interior bed panels. Exterior bed panels and interior bed panels are collectively referred to herein as "truck bed panels" or simply "bed panels".

Vehicle panels 42 may be fixed to corresponding body panels 30, that define the exterior of the truck bed 32. For example, vehicle panels 42 may extend between a storage space 50 of the truck bed 32 and corresponding body panels 30. Vehicle panels 42 may be manufactured from a resin composite material, a metal matrix material or any other material suitable for vehicle construction. For example, vehicle panels 42 may be manufactured from a steel reinforced composite material. Vehicle panels 42 may be constructed more flexibly than the body panels 30. Moreover, vehicle panels 42 and/or body panels 30 may define bed rails 52 along the truck bed 32. For example, bed rails 52 may extend along the side boards and head boards of the truck bed 32.

In the exemplary embodiment, electrical outlet assembly 100 is located within truck bed 32, and is accessible from the interior or storage space 50 of truck bed 32. In the exemplary embodiment, electrical outlet assembly 100 is located within passenger side bed panel 46, although in other embodiments electrical outlet assembly 100 may be located at other portions of truck bed 32, such as, for example and without limitation, within driver side bed panel 44 or within head board bed panel 48. In yet other embodiments, electrical outlet assembly 100 may be located along any other portion of vehicle 20 that enables electrical outlet assembly 100 to function as described herein.

Figure 2:
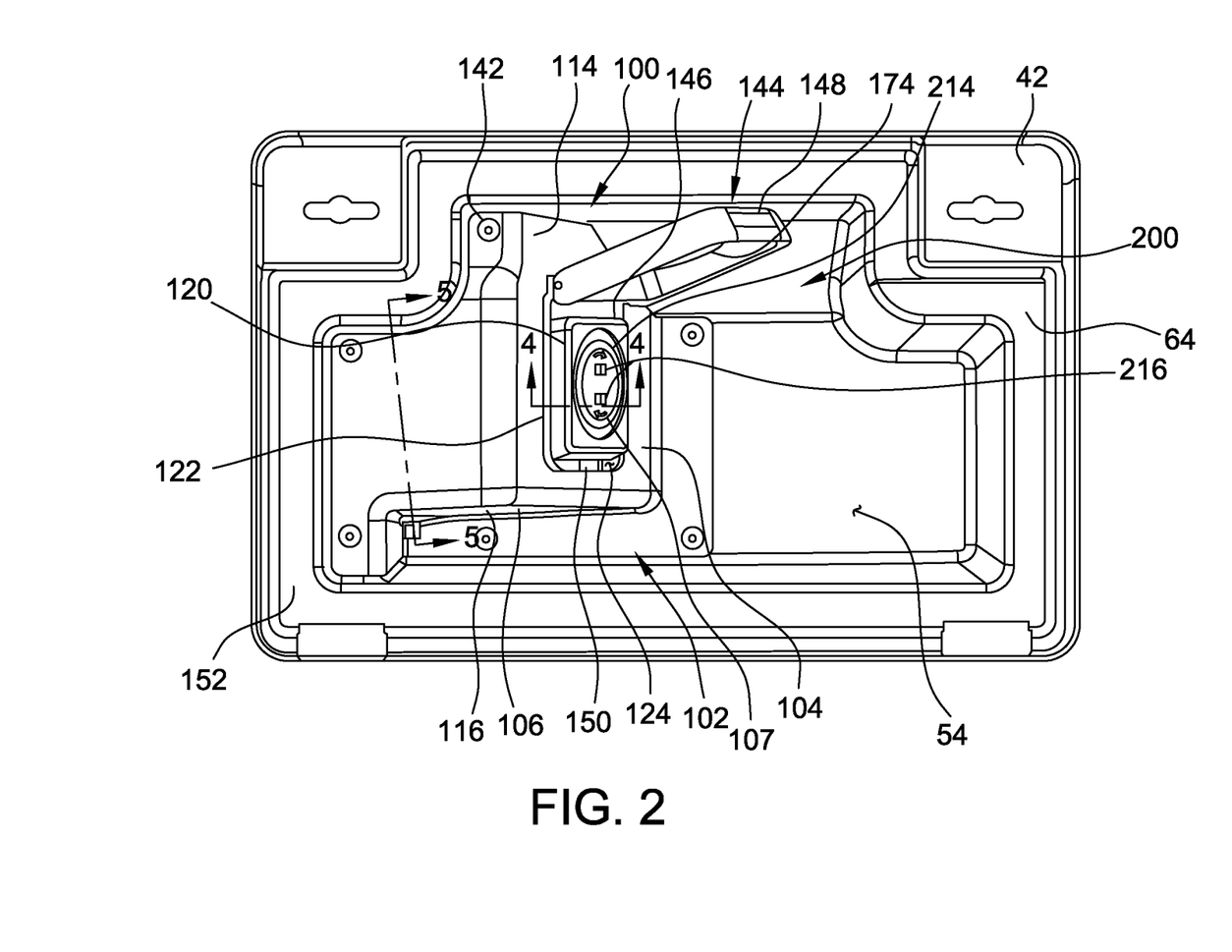
FIG. 2 is a perspective view of the electrical outlet assembly coupled to a vehicle panel of the vehicle shown in FIG. 1
Figure 3:
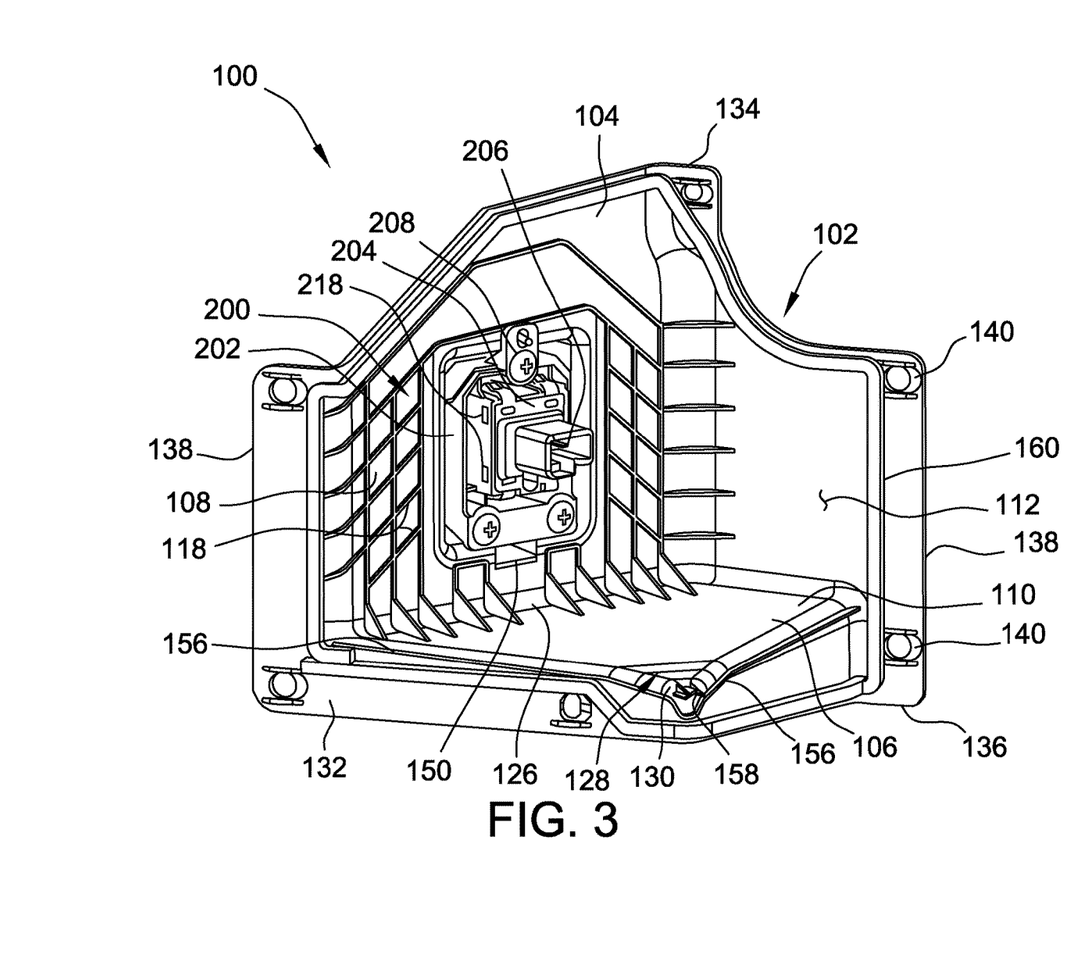
FIG. 3 is a rear perspective view of the electrical outlet assembly shown in FIG. 2.

FIG. 2 is a perspective view of electrical outlet assembly 100 coupled to one of vehicle panels 42 (specifically, passenger side bed panel 46), and FIG. 3 is a rear perspective view of electrical outlet assembly 100. As shown in FIG. 2, electrical outlet assembly 100 generally includes a panel 102 coupled to vehicle panel 42 of truck bed 32, and an electrical receptacle 200 mounted to panel 102. Panel 102 includes a sidewall 104 oriented in a generally vertical orientation, and a bottom wall 106 extending from sidewall 104 and oriented in a generally horizontal orientation. Electrical receptacle 200 is coupled to sidewall 104 and is positioned within a receptacle opening 107 defined by sidewall 104. Electrical receptacle 200 is electrically coupled to energy storage device 28 of vehicle 20 such that electrically-powered devices can be coupled to electrical receptacle 200 and receive electrical power from energy storage device 28 of vehicle 20 through electrical receptacle 200.

As shown in FIGS. 2 and 3, sidewall 104 and bottom wall 106 each include respective interior surfaces 108 and 110 that face towards an interior cavity 112 defined by panel 102, and respective exterior surfaces 114 and 116 that face away from interior cavity 112. Sidewall 104 is a generally planar member that includes curved edges or transitions between sidewall 104 and other portions of panel 102. In the exemplary embodiment, sidewall 104 includes a plurality of reinforcing elements 118, such as ribs, that extend outward from sidewall interior surface 108 to enhance the structural integrity of sidewall 104. Moreover, as shown in FIG. 2, sidewall 104 includes a raised receptacle mount 120 that extends outward from exterior surface 114 of sidewall 104. Sidewall 104 also includes a lip 122 that extends outwardly from sidewall exterior surface 114 and around raised receptacle mount 120. A drainage channel 124 is defined between raised receptacle mount 120 and lip 122 to facilitate draining water and other liquids from around electrical receptacle 200.

Bottom wall 106 is a generally planar member that includes curved edges or transitions 126. Sidewall 104 adjoins bottom wall 106 along one of edges 126. As shown in FIG. 3, two curved edges 126 of bottom wall 106 converge at a corner portion 128 of bottom wall 106 to define a downwardly-curved portion 130 of bottom wall 106.

Panel 102 also includes a body mounting flange 132 configured to be coupled or mounted to the body of vehicle 20. Body mounting flange 132 extends continuously about the perimeter of sidewall 104 and bottom wall 106, and adjoins sidewall 104 and bottom wall 106 along respective edges. Body mounting flange 132 generally defines the peripheral edges of panel 102, including a top edge 134, an opposing bottom edge 136, and side edges 138 that extend between top edge 134 and bottom edge 136. Body mounting flange 132 defines a plurality of fastener openings 140 sized and shaped to receive corresponding panel fasteners 142 (shown in FIG. 2) therein to secure panel 102 to vehicle panel 42. In the exemplary embodiment, panel fasteners 142 are tapping screws. In other embodiments, panel fasteners 142 may be any suitable fastening device that enables electrical outlet assembly 100 to function as described herein including, for example and without limitation, bolts, screws, nails, rivets, snaps, and/or clips. When panel 102 is coupled to vehicle panel 42, panel 102 defines and generally encloses interior cavity 112, as shown in FIG. 3. As described in more detail herein, electrical outlet assembly 100 includes a plurality of waterproofing features designed to expel water and other liquids from interior cavity 112, and to prevent or inhibit water and other liquids from entering interior cavity 112.

Panel 102 also includes a receptacle cover 144 hingedly coupled to sidewall 104. Receptacle cover 144 is moveable between a closed position (not shown in FIG. 2), in which receptacle cover 144 covers electrical receptacle, and an open position (shown in FIG. 2), in which electrical receptacle 200 is accessible. Receptacle cover 144 generally covers electrical receptacle 200 to substantially inhibit water and other liquids from reaching electrical receptacle 200 and components thereof, as described in more detail herein. A biasing element 146 biases receptacle cover 144 towards the closed position. In the exemplary embodiment, biasing element 146 is a torsion spring, although biasing element 146 may be any other suitable biasing element or spring that enables receptacle cover 144 to function as described herein. Receptacle cover 144 further includes a finger pocket 148 to facilitate opening receptacle cover 144.

Panel 102 may be manufactured from the same materials as vehicle panels 42 and body panels 30, including, for example and without limitation, resin composite materials, metal matrix materials, and/or any other material suitable for vehicle construction. In some embodiments, for example, panel 102 is manufactured from a steel reinforced composite material. In other embodiments, panel 102 is manufactured from a glass fiber reinforced resin. Moreover, in some embodiments, panel 102 may have a unitary construction. That is, portions of panel 102 may be formed integrally or as an integral unit. In some embodiments, for example, sidewall 104, bottom wall 106, and/or body mounting flange 132 are formed as a single, integral body (e.g., from a single, form-stamped sheet of composite material).

Electrical receptacle 200 is coupled to panel sidewall 104, and is positioned within receptacle opening 107 defined in sidewall 104. In the exemplary embodiment, electrical receptacle 200 is mounted to sidewall 104 at raised receptacle mount 120. Electrical receptacle 200 is electrically coupled to energy storage device 28 of vehicle 20, and receives male-ended electrical connectors, such as conductive prongs or pins, to enable electrical power to be supplied to electrically-powered devices coupled to electrical receptacle 200. Electrical receptacle 200 may have any suitable configuration that enables electrical receptacle 200 to transmit electrical power from energy storage device 28 to devices electrically coupled to electrical receptacle 200. In the exemplary embodiment, electrical receptacle 200 is a two-pin socket receptacle. In other embodiments, electrical receptacle 200 may be any other receptacle, such as a three-pin socket receptacle. In some embodiments, electrical receptacle 200 may have an output power capacity rating of at least 400 watts (W).

As shown in FIG. 3, electrical receptacle 200 includes a receptacle base 202 coupled to sidewall 104, a receptacle housing 204 coupled to receptacle base 202, and a plurality of conductive contacts 206 (only one illustrated in FIG. 3) housed or enclosed within receptacle base 202 and/or receptacle housing 204. Receptacle base 202 is coupled to sidewall 104 via a plurality of receptacle fasteners 208. In the exemplary embodiment, receptacle fasteners 208 are screws, although any other suitable fastener may be used to secure electrical receptacle 200 to panel 102, including, for example and without limitation, bolts, nails, rivets, snaps, and/or clips. Receptacle housing 204 is secured to receptacle base 202 by a press-fit or snap-fit connection such that electrical components of electrical receptacle (e.g., conductive contacts 206) are enclosed within receptacle housing 204 and/or between receptacle housing 204 and receptacle base 202. Receptacle housing 204 defines a connector interface used to connect to a conductive conduit (e.g., a wire harness) to electrically couple electrical receptacle 200 to energy storage device 28 of vehicle 20. Receptacle base 202 and receptacle housing 204 may be constructed from electrically insulative materials including, for example and without limitation, molded plastics. Conductive contacts 206 engage conductive prongs or pins of an electrical plug (not shown), and are generally fabricated from electrically-conductive materials, including, for example and without limitation, copper, aluminum, and combinations thereof.

Figure 4:
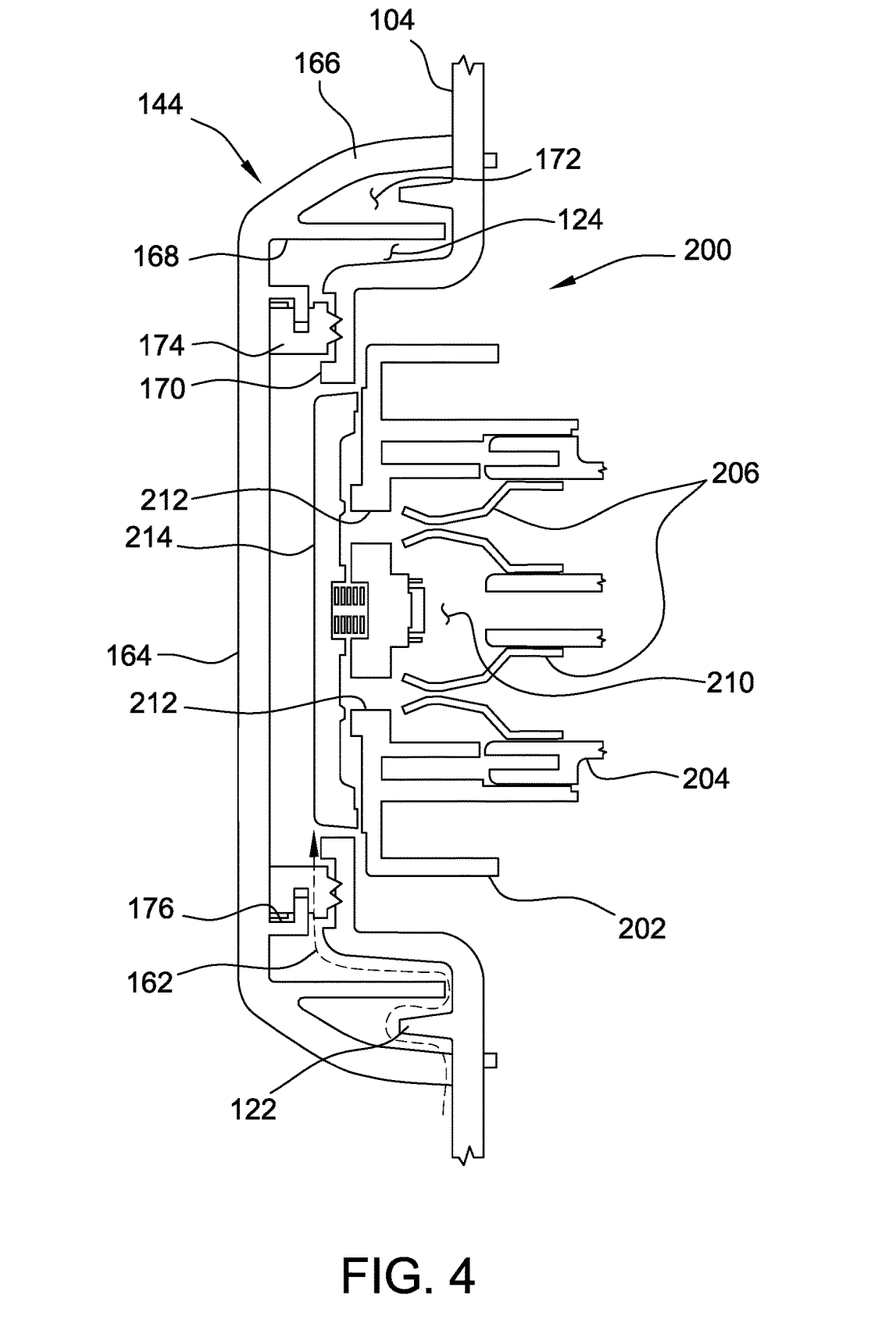
FIG. 4 is a cross-sectional view of the electrical outlet assembly of FIG. 2 taken along line 4-4 shown in FIG. 2.

FIG. 4 is a cross-sectional view of electrical outlet assembly 100 taken along line 4-4 shown in FIG. 2. As shown in FIG. 4, conductive contacts 206 are positioned within an interior 210 of electrical receptacle 200 defined by receptacle housing 204 and receptacle base 202. Conductive contacts 206 are accessible through inner electrical connector openings 212 defined in receptacle base 202. Each inner electrical connector opening 212 is sized and shaped to receive a single, male-ended electrical connector, such as a prong or pin, and is generally aligned with a corresponding conductive contact 206.

In the exemplary embodiment, electrical receptacle 200 also includes a face plate or cover 214 that includes a plurality of outer electrical connector openings 216 (shown in FIG. 2) defined therein that are each sized and shaped to receive a male-ended electrical connector. Face plate 214 is rotatably coupled to receptacle base 202 such that face plate 214 can be rotated between a first position, in which outer electrical connector openings 216 are aligned with inner electrical connector openings 212, and a second position, in which outer electrical connector openings 216 are not aligned with (i.e., are out of alignment with) inner electrical connector openings 212.

In the exemplary embodiment, receptacle interior 210 is exposed to or in fluid communication with an exterior of electrical receptacle 200 (i.e., interior cavity 112 defined by panel 102). That is, receptacle interior 210 is not sealed or isolated from the exterior such that environmental transfer is permitted between interior 210 and exterior of electrical receptacle 200. For example, receptacle base 202 and receptacle housing 204 include fastener openings 218 (colloquially referred to as "snaps") that are used during the manufacture and assembly of electrical receptacle 200. Fastener openings 218 enable environmental and fluid communication between interior 210 and the exterior of electrical receptacle 200. Known receptacles generally require that electrical receptacle 200 be waterproofed or sealed to prevent or inhibit ingress of water and other liquids into electrical receptacle 200. In contrast, embodiments of the electrical outlet assemblies described herein enable use of non-sealed or non-waterproofed electrical receptacles by providing a substantially water and liquid free environment around the electrical receptacle. More specifically, electrical outlet assembly 100 includes a plurality of waterproofing features designed to expel water and other liquids from interior cavity 112, and to prevent or inhibit water and other liquids from entering interior cavity 112.

Referring to FIGS. 2 and 3, for example, panel 102 includes a first drain opening 150 and a second drain opening 152 defined therein. Openings 150 and 152 are oriented to direct liquids that enter interior cavity 112 out of interior cavity 112 and into truck bed 32. Each opening 150 and 152 provides fluid communication with interior cavity 112. In the exemplary embodiment, first drain opening 150 is defined by sidewall 104 beneath electrical receptacle 200, and second drain opening 152 is defined by panel 102 at a location generally below first drain opening 150 such that liquids that enter interior cavity 112 through first drain opening 150 are gravity fed towards second drain opening 152.

Figure 5:
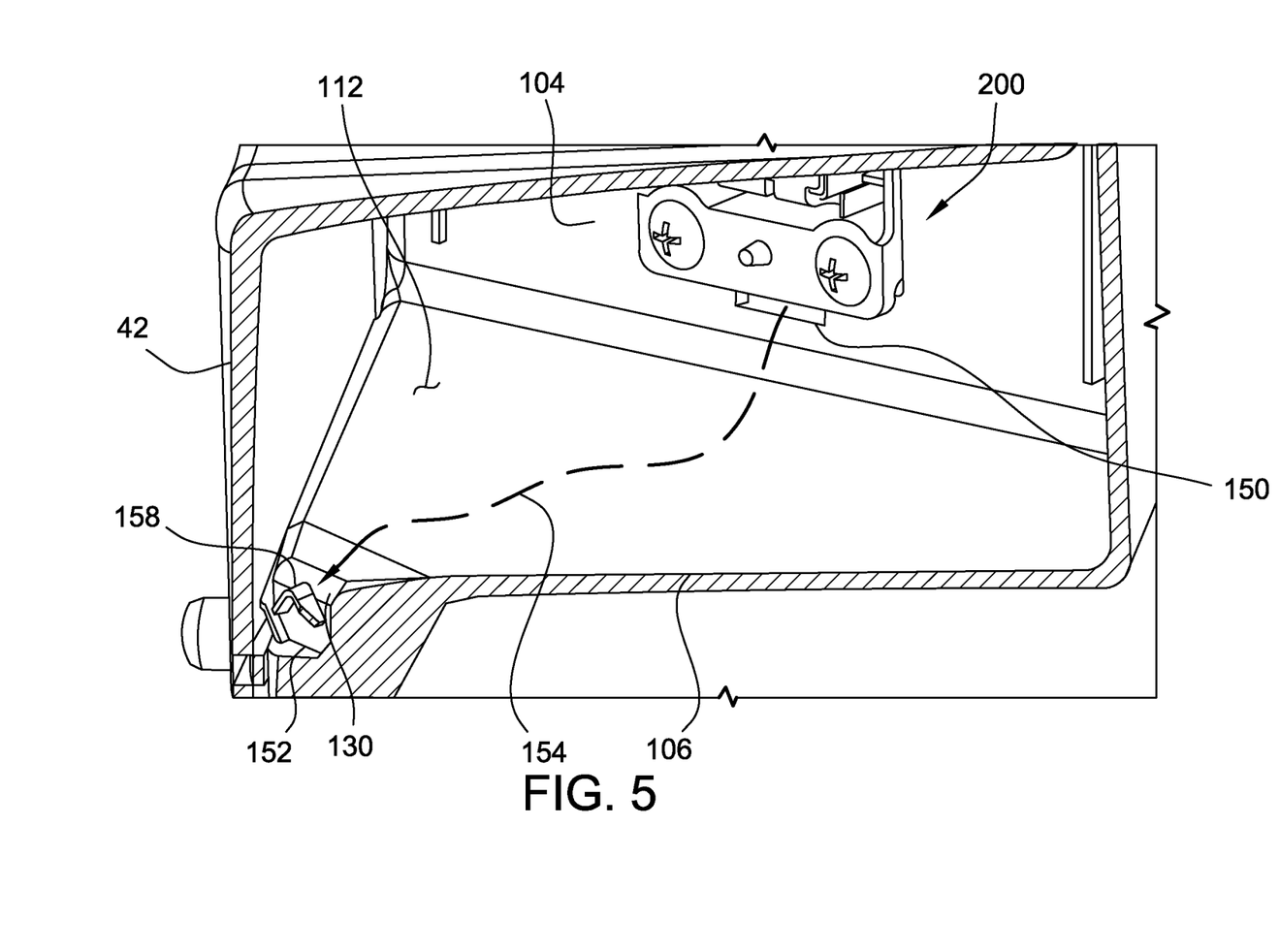
FIG. 5 is a cross-sectional view of the electrical outlet assembly of FIG. 2 taken along line 5-5 shown in FIG. 2.

FIG. 5 is a cross-sectional view of panel 102 taken along 5-5 shown in FIG. 2, and illustrates a fluid flow path 154 of liquid that enters interior cavity 112 through first drain opening 150. As shown in FIG. 5, liquid entering interior cavity 112 through first drain opening 150 is directed toward second drain opening 152 by bottom wall 106.

Referring to FIGS. 3-5, in the exemplary embodiment, first drain opening 150 is between sidewall lip 122 and raised receptacle mount 120 such that liquids entrapped by drainage channel 124 are directed towards and through first drain opening 150. Further, in the exemplary embodiment, second drain opening 152 is defined by bottom wall 106 at a bottom of downwardly-curved portion 130. Specifically, second drain opening 152 is between bottom wall 106 and body mounting flange 132. In other embodiments, second drain opening 152 may be defined at any suitable location along panel 102 that enables electrical outlet assembly 100 to function as described herein.

Panel 102 directs liquid that enters interior cavity 112 through first drain opening 150 out of second drain opening 152 and into truck bed 32. In the exemplary embodiment, bottom wall 106 is oriented at an oblique angle slightly greater than 90° relative to sidewall 104 such that liquids entering interior cavity 112 through first drain opening 150 flow downwardly and along bottom wall 106 under the force of gravity towards second drain opening 152. Further, in the exemplary embodiment, panel 102 includes fluid guides 156 that direct liquids within interior cavity 112 towards second drain opening 152. Each fluid guide 156 extends or projects outward from interior surface 110 bottom wall 106 at one of curved edges 126, and extends along bottom wall 106 towards second drain opening 152 at a general downward slope relative to horizontal such that liquids that flow off of bottom wall 106 are directed towards second drain opening 152 by fluid guides 156. In the exemplary embodiment, the downward slope of each of fluid guides 156 gradually increases as fluid guide 156 approaches second drain opening 152.

Panel 102 also includes a fluid barrier tab 158 above second drain opening 152. Tab 158 inhibits fluid flow into interior cavity 112 through second drain opening 152, and extends outward from bottom wall 106 at downwardly-curved portion 130, and above second drain opening 152. Fluid barrier tab 158 is sized and shaped to engage vehicle panel 42 to which panel 102 is coupled. Moreover, fluid barrier tab 158 is shaped to inhibit liquids from entering interior cavity 112 through second drain opening 152. In the exemplary embodiment, fluid barrier tab 158 has an arcuate, concave downward shape with respect to second drain opening 152. In other embodiments, fluid barrier tab 158 may have a shape other than an arcuate, concave downward shape. Liquids that enter interior cavity 112 through second drain opening 152 are directed generally downwardly by fluid barrier tab 158 towards fluid guides 156 and out of second drain opening 152.

Referring again to FIG. 3, panel 102 also includes a peripheral seal 160 coupled to body mounting flange 132 and extending continuously along a perimeter of body mounting flange 132. Peripheral seal 160 sealingly engages vehicle panel 42 when panel 102 is coupled thereto to form a substantially liquid impermeable barrier around interior cavity 112. Specifically, when panel 102 is coupled to one of vehicle panels 42, peripheral seal 160 is compressed between body mounting flange 132 and vehicle panel 42 to form a substantially liquid impermeable barrier. Peripheral seal 160 is spaced further inward from the peripheral edge of panel 102 than each of fastener openings 140. That is, peripheral seal 160 is inward from each of fastener openings 140 relative to the peripheral edge of panel 102 such that peripheral seal 160 inhibits water or other liquids that pass through fastener openings 140 from entering interior cavity 112. Peripheral seal 160 may be constructed from a variety of suitable sealing materials, including, for example and without limitation, natural and synthetic rubbers, and any other semi soft water impermeable material that may be attached or integrally molded to panel 102.

As noted above, receptacle cover 144 also inhibits water and other liquids from reaching electrical receptacle 200 and components thereof. For example, in the exemplary embodiment, receptacle cover 144 is configured to cooperate with elements of sidewall 104 to define a circuitous or labyrinth flow path 162 to electrical receptacle 200 when receptacle cover 144 is in the closed position, shown in FIG. 4. Specifically, receptacle cover 144 includes a base wall 164, an outer, peripheral wall 166 extending around a perimeter of base wall 164, and a second, inner wall 168 spaced laterally inward from outer wall 166. Base wall 164 is substantially planar, and is oriented substantially parallel to sidewall 104 and an outer surface 170 of raised receptacle mount 120 when receptacle cover 144 is in the closed position. Each of outer wall 166 and inner wall 168 extend outward from base wall 164, and towards sidewall 104 of panel 102 when receptacle cover 144 is in the closed position. Outer wall 166 and inner wall 168 are spaced laterally apart from one another, and cooperatively define a channel 172 within receptacle cover 144. As shown in FIG. 4, when receptacle cover 144 is in the closed position, lip 122 of sidewall 104 is positioned between outer wall 166 and inner wall 168 of receptacle cover 144 and within channel 172 defined by outer wall 166 and inner wall 168. Moreover, inner wall 168 of receptacle cover 144 is positioned between lip 122 of sidewall 104 and raised receptacle mount 120 and within drainage channel 124. As such, outer wall 166, inner wall 168, lip 122, and raised receptacle mount 120 define circuitous or labyrinth flow path 162 from an exterior of receptacle cover 144 to electrical receptacle 200 when receptacle cover 144 is in the closed position.

Receptacle cover 144 also includes a seal 174 configured to sealingly engage outer surface 170 of raised receptacle mount 120 when receptacle cover 144 is in the closed position to provide a fluid tight seal around electrical receptacle 200. In the exemplary embodiment, seal 174 is spaced laterally inward from outer wall 166 and inner wall 168, and is secured to base wall 164 by an annular rim 176 of receptacle cover 144.

In some embodiments, electrical outlet assembly 100 may be located or positioned within a side pocket or recess defined by one or more of body panels 30 and/or vehicle panels 42 to provide additional protection for electrical outlet assembly 100 from ingress of water and other liquids. In the exemplary embodiment, electrical outlet assembly 100 is positioned within a side pocket or recess 54 defined in vehicle panel 42, as shown in FIG. 2.

Figure 6:
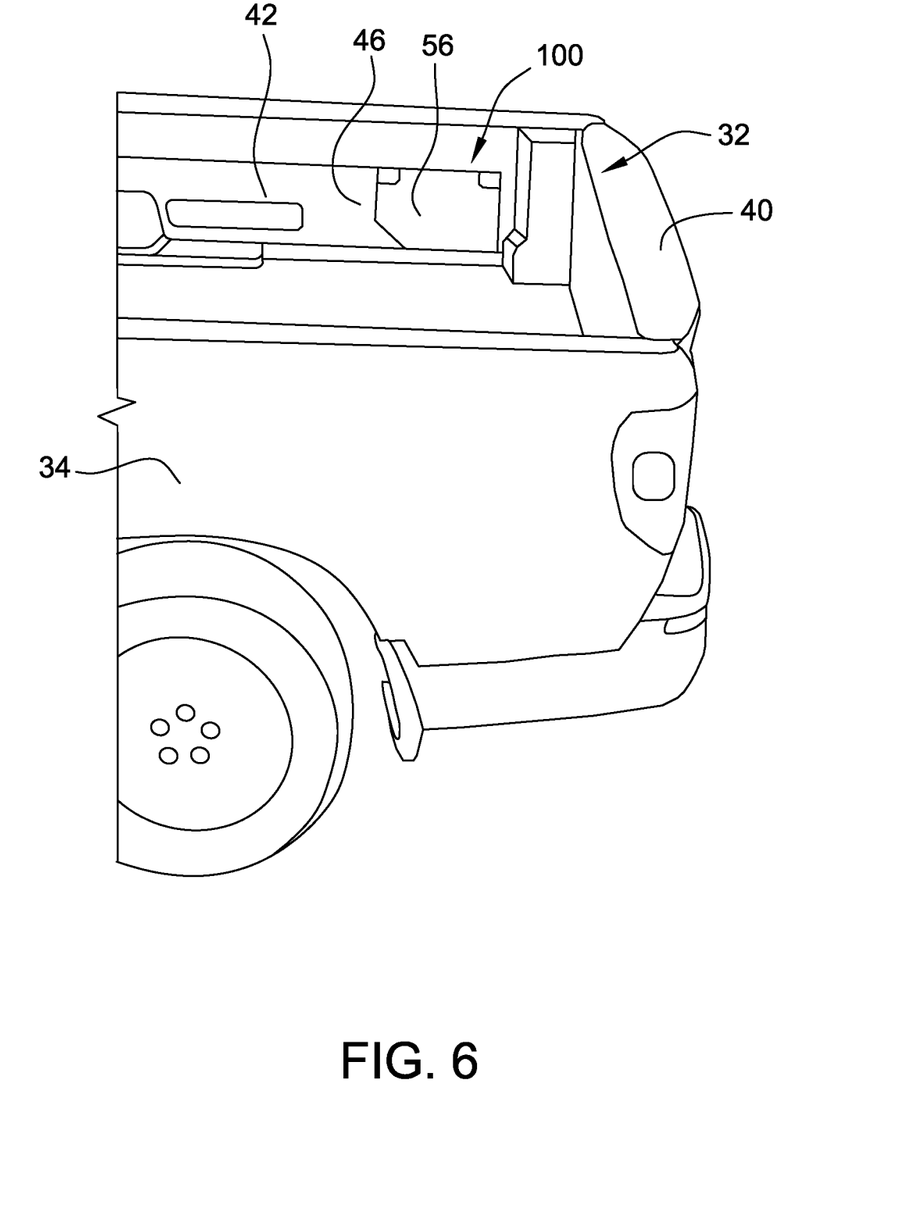
FIG. 6 is perspective view of a portion of a truck bed of the vehicle of FIG. 1.

FIG. 6 is a perspective view of a portion of truck bed 32 illustrating the location of electrical outlet assembly 100 relative to truck bed 32 in the exemplary embodiment. As shown in FIG. 6, in the exemplary embodiment, electrical outlet assembly 100 is enclosed within side pocket 54 by a side lining lid or panel 56. Side lining panel 56 is removably coupleable to vehicle panel 42 such that side pocket 54 can be selectively covered and uncovered by side lining panel 56.

Figure 7:
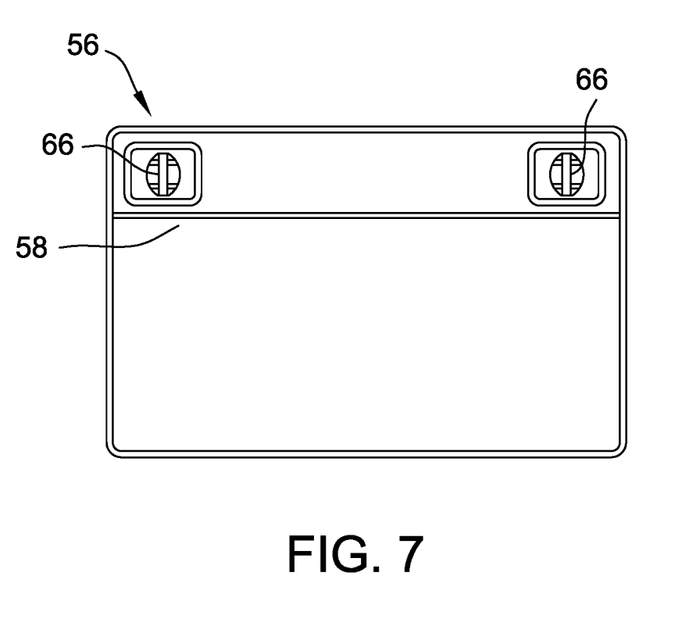
FIG. 7 is a front view of a side lining panel of the vehicle shown in FIG. 6.
Figure 8:
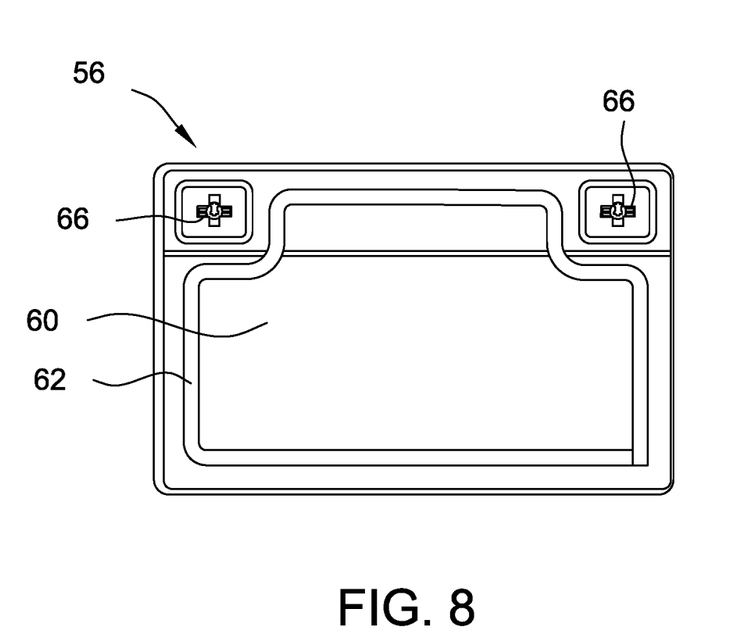
FIG. 8 is a rear view of the side lining panel shown in FIG. 7.

FIG. 7 is a front view of side lining panel 56 and FIG. 8 is a rear view of side lining panel 56. As shown in FIGS. 7 and 8, side lining panel 56 includes an exterior surface 58 that faces away from side pocket 54 and towards truck bed 32, and an interior surface 60 that faces away from truck bed 32 and towards side pocket 54. As shown in FIG. 8, side lining panel 56 includes a peripheral seal 62 coupled to interior surface 60. Peripheral seal 62 extends continuously along a perimeter or peripheral edge of side lining panel 56, and is configured to sealingly engage a recessed mounting surface 64 of vehicle panel 42 to form a substantially liquid impermeable barrier around side pocket 54. Specifically, when side lining panel 56 is coupled to one of vehicle panels 42, peripheral seal 62 is compressed between recessed mounting surface 64 and side lining panel 56 to form a substantially liquid impermeable barrier around side pocket 54.

In the exemplary embodiment, side lining panel 56 includes fasteners 66 configured to removably couple side lining panel 56 to vehicle panel 42. Fasteners 66 cooperatively engage fastening elements (e.g., fastener openings) on vehicle panel 42 to removably couple side lining panel 56 to vehicle panel 42. In the exemplary embodiment, fasteners 66 are quarter-turn fasteners, although in other embodiments, fasteners 66 may be any other suitable fastener that enables side lining panel 56 to function as described herein including, for example and without limitation, screws and bolts. Peripheral seal 62 is spaced further inward from the peripheral edge of side lining panel 56 than each of fasteners 66 such that peripheral seal 62 inhibits water or other liquids that pass through side lining panel 56 around fasteners 66 from entering side pocket 54. Peripheral seal 62 may be constructed of the same materials as peripheral seal 160 of panel 102, including, for example and without limitation, natural and synthetic rubbers.

To assemble electrical outlet assembly 100, electrical receptacle 200 is coupled to sidewall 104 of panel 102 such that electrical receptacle 200 is accessible through receptacle opening 107 defined in sidewall 104 and such that first drain opening 150 is positioned beneath electrical receptacle 200. Coupling electrical receptacle 200 to sidewall 104 may include securing receptacle base 202 to sidewall 104 using receptacle fasteners 208. Assembling electrical outlet assembly 100 further includes coupling panel 102 to one of vehicle panels 42 to define interior cavity 112. In the exemplary embodiment, panel 102 is coupled to one of vehicle panels 42 after electrical receptacle 200 is coupled to sidewall 104, although in other embodiments, electrical receptacle 200 may be coupled to sidewall 104 after panel 102 is coupled to one of vehicle panels 42. Coupling panel 102 to one of vehicle panels 42 includes coupling panel 102 to vehicle panel 42 such that each of first and second drain openings 150, 152 provides fluid communication with interior cavity 112, and such that panel 102 is configured to direct fluid that enters interior cavity 112 through first drain opening 150 out of second drain opening 152 and into truck bed 32. Moreover, coupling panel 102 to vehicle panel 42 may include coupling body mounting flange 132 to vehicle panel 42 using panel fasteners 142 such that peripheral seal 62 is compressed between body mounting flange 132 and vehicle panel 42 to form a substantially liquid impermeable barrier around interior cavity 112. Assembling electrical outlet assembly 100 further includes electrically coupling electrical receptacle 200 to energy storage device 28 of vehicle 20 using a suitable electrical conduit, such as a cable harness.

In some embodiments, assembling electrical outlet assembly 100 may further include orienting panel 102 relative to vehicle panel 42 such that fluid barrier tab 158 is positioned over second drain opening 152 and is configured to inhibit fluid flow through second drain opening 152 into interior cavity 112. Moreover, in some embodiments, assembling electrical outlet assembly 100 may further include positioning panel 102 within side pocket 54 of truck bed 32, and coupling side lining panel 56 to vehicle panel 42 to enclose panel 102 and electrical receptacle 200 within side pocket 54. Coupling side lining panel 56 to vehicle panel 42 may include coupling side lining panel 56 to recessed mounting surface 64 of vehicle panel 42 such that peripheral seal 62 is compressed between recessed mounting surface 64 and side lining panel 56 to form a substantially liquid impermeable barrier around side pocket 54.

Embodiments of the electrical outlet assemblies and methods described herein facilitate preventing or inhibiting the ingress of water and other liquids to electrical receptacles located on an exterior of a vehicle (i.e., outside the interior compartment). Moreover, the electrical outlet assemblies of the present disclosure facilitate reducing the cost and time associated with producing vehicles that include exterior electrical outlet assemblies by eliminating or reducing the need to waterproof or weatherproof electrical receptacles located on the exterior of a vehicle.

Exemplary embodiments of electrical outlet assemblies and methods of assembling same are described herein. The systems and methods described herein are not limited to the specific embodiments described herein, but rather, components of the systems and/or steps of the methods may be utilized independently and separately from other components and/or steps described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical outlet assembly for a vehicle, said electrical outlet assembly comprising:

a panel comprising a sidewall and a bottom wall extending from said sidewall, said panel coupleable to a vehicle panel of the vehicle to define an interior cavity therewith;

an electrical receptacle coupled within a receptacle opening defined in said sidewall;

wherein said sidewall defines a first drain opening beneath said electrical receptacle, and said bottom wall at least partially defines a second drain opening, each of the first and second drain openings providing fluid communication with the interior cavity, wherein said panel is configured to direct fluid that enters the interior cavity through the first drain opening out of the second drain opening and away from said electrical receptacle.

2. The electrical outlet assembly of claim 1, wherein said panel further comprises a fluid barrier tab extending from said bottom wall and above the second drain opening, wherein said fluid barrier tab is configured to inhibit fluid flow through the second drain opening into the interior cavity.

3. The electrical outlet assembly of claim 2, wherein said fluid barrier tab has an arcuate shape and is concave downward.

4. The electrical outlet assembly of claim 1, further comprising a receptacle cover hingedly coupled to said sidewall, said receptacle cover comprising a seal, wherein said receptacle cover is moveable between an opened position and a closed position in which said seal sealingly engages a portion of said sidewall to provide a fluid tight seal around said electrical receptacle.

5. The electrical outlet assembly of claim 4, wherein said sidewall comprises a raised receptacle mount and a lip extending outward from said sidewall and around said receptacle mount, wherein said seal sealingly engages an outer surface of said receptacle mount when said receptacle cover is in the closed position, and wherein said receptacle cover and said lip cooperatively define a circuitous flow path to said electrical receptacle when said receptacle cover is in the closed position.

6. The electrical outlet assembly of claim 5, wherein the first drain opening is defined between said receptacle mount and said lip.

7. The electrical outlet assembly of claim 1, wherein said panel comprises a body mounting flange configured to couple to the vehicle panel, said panel further comprising a peripheral seal coupled to said body mounting flange and extending along a perimeter of said body mounting flange, said peripheral seal configured to sealingly engage the vehicle panel when said panel is coupled thereto to form a substantially liquid impermeable barrier around the interior cavity.

8. The electrical outlet assembly of claim 1, wherein said panel is a first panel, said electrical outlet assembly further comprising a second panel removably coupleable to the vehicle panel to enclose said first panel within a recess defined within the vehicle panel.

9. The electrical outlet assembly of claim 8, wherein said second panel comprises a peripheral seal extending along a perimeter of said second panel, said peripheral seal configured to sealingly engage the vehicle panel when said second panel is coupled thereto.

10. The electrical outlet assembly of claim 1, wherein said electrical receptacle defines an interior, said electrical receptacle comprising a plurality of conductive contacts disposed within the interior, wherein the interior of said electrical receptacle is unsealed from the interior cavity such that environmental transfer is permitted between the interior of said electrical receptacle and the interior cavity.

11. The electrical outlet assembly of claim 1, wherein the vehicle is a truck having a truck bed defined by a plurality of bed panels, said panel coupleable to one of the plurality of bed panels to define the interior cavity therewith, wherein said panel is configured to direct fluid that enters the interior cavity through the first drain opening out of the second drain opening and into the truck bed.

12. A truck comprising:

a truck bed defined by a plurality of bed panels; and an electrical outlet assembly positioned within said truck bed, said electrical outlet assembly comprising:

a panel comprising a sidewall and a bottom wall extending from said sidewall, said panel coupled to one of said plurality of bed panels to define an interior cavity therewith; and an electrical receptacle coupled within a receptacle opening defined in said sidewall;

wherein said sidewall defines a first drain opening beneath said electrical receptacle, and said bottom wall at least partially defines a second drain opening, each of the first and second drain openings providing fluid communication with the interior cavity, wherein said panel is configured to direct fluid that enters the interior cavity through the first drain opening out of the second drain opening and into said truck bed.

13. The truck of claim 12, wherein said panel further comprises a fluid barrier tab extending from said bottom wall and above the second drain opening, wherein said fluid barrier tab is configured to inhibit fluid flow through the second drain opening into the interior cavity.

14. The truck of claim 12, wherein said panel comprises a body mounting flange coupled to said one of said plurality of bed panels, said panel further comprising a peripheral seal coupled to said body mounting flange and extending along a perimeter of said body mounting flange, wherein said peripheral seal sealingly engages said one of said plurality of bed panels to form a substantially liquid impermeable barrier around the interior cavity.

15. The truck of claim 12, wherein said truck further comprises an energy storage device, said electrical receptacle electrically coupled to said energy storage device.

16. The truck of claim 12, wherein said electrical receptacle is configured to supply electrical power in the form of alternating current.

17. The truck of claim 12, wherein said electrical receptacle is a non-waterproofed electrical receptacle.

18. A method of assembling an electrical outlet assembly on a vehicle, said method comprising:

providing a panel including a sidewall and a bottom wall extending from the sidewall, wherein the sidewall defines a first drain opening and the bottom wall at least partially defines a second drain opening;

coupling an electrical receptacle within a receptacle opening defined in the sidewall such that the first drain opening is positioned beneath the electrical receptacle; and coupling the panel to a vehicle panel of the vehicle to define an interior cavity therewith, wherein coupling the panel includes coupling the panel to the vehicle panel such that each of the first and second drain openings provides fluid communication with the interior cavity and such that the panel is configured to direct fluid that enters the interior cavity through the first drain opening out of the second drain opening and away from the electrical receptacle.

19. The method of claim 18, wherein the panel includes a body mounting flange and a peripheral seal connected to the body mounting flange, and wherein coupling the panel to the vehicle panel includes coupling the body mounting flange to the vehicle panel such that the peripheral seal is compressed between the body mounting flange and the vehicle panel to form a substantially liquid impermeable barrier around the interior cavity.

20. The method of claim 18, wherein the panel includes a fluid barrier tab extending from the bottom wall, said method further comprising orienting the panel relative to the vehicle panel such that the fluid barrier tab is positioned above the second drain opening and is configured to inhibit fluid flow through the second drain opening into the interior cavity.

* * * * *